United States Patent [19]
Yamada et al.

[11] Patent Number: 5,170,382
[45] Date of Patent: Dec. 8, 1992

[54] MAGNETO-OPTICAL RECORDING APPARATUS FOR CREATING MAGNETIC DOMAINS WITH REDUCED TAILS

[75] Inventors: Kouichi Yamada; Isao Watanabe, both of Amagasaki, Japan

[73] Assignee: Mitsubishi Denki Kabushiki Kaisha, Hyogo, Japan

[21] Appl. No.: 610,064

[22] Filed: Nov. 7, 1990

[30] Foreign Application Priority Data

Nov. 14, 1989 [JP] Japan .................... 1-296852

[51] Int. Cl.$^5$ .................... G11B 13/04; G11B 11/10; G11B 11/12
[52] U.S. Cl. .................... 369/13
[58] Field of Search .................... 369/13, 110, 116; 360/59, 114

[56] References Cited

U.S. PATENT DOCUMENTS

| | | | |
|---|---|---|---|
| 4,426,693 | 1/1984 | Satoh et al. | 369/116 |
| 4,807,210 | 2/1989 | Kaku et al. | 369/13 |
| 4,949,329 | 8/1990 | Furman et al. | 369/119 |
| 5,014,254 | 5/1991 | Van Rosmalen et al. | 369/13 |

FOREIGN PATENT DOCUMENTS

| | | | |
|---|---|---|---|
| 61-190741 | 8/1986 | Japan | 369/13 |
| 63-171456 | 7/1988 | Japan | |
| 1-248341 | 10/1989 | Japan | |

OTHER PUBLICATIONS

"A Magneto-Optical Recording Method of Magnetic Field Mudulation with Pulse Radiated Laser," Fujita et al., ISOM '89 Technical digest, 28D-3, pp. 179-180 1989.

"Magneto-Optical Recording Characteristics of TbFeCo Media by Magnetic Field Modulation Method," Tanaka et al., Japanese Journal of Aplied Physics, vol. 26, No. 2, (1987) pp. 231-235.

Primary Examiner—Hoa Nguyen

[57] ABSTRACT

A magneto-optical recording apparatus records an information signal on a disk by illuminating a magnetic layer on the disk with a pulsed laser beam having a frequency at least twice the maximum frequency of the information signal, and applying a magnetic field with a polarity switched according to the information signal to the spot illuminated by the laser beam. To ensure erasure of old information, the apparatus can modify the peak power level, bottom power level, duty cycle, or frequency of the pulsed laser beam according to the radial position of the beam on the disk.

30 Claims, 12 Drawing Sheets

RECORDED BIT

RECORDED BIT

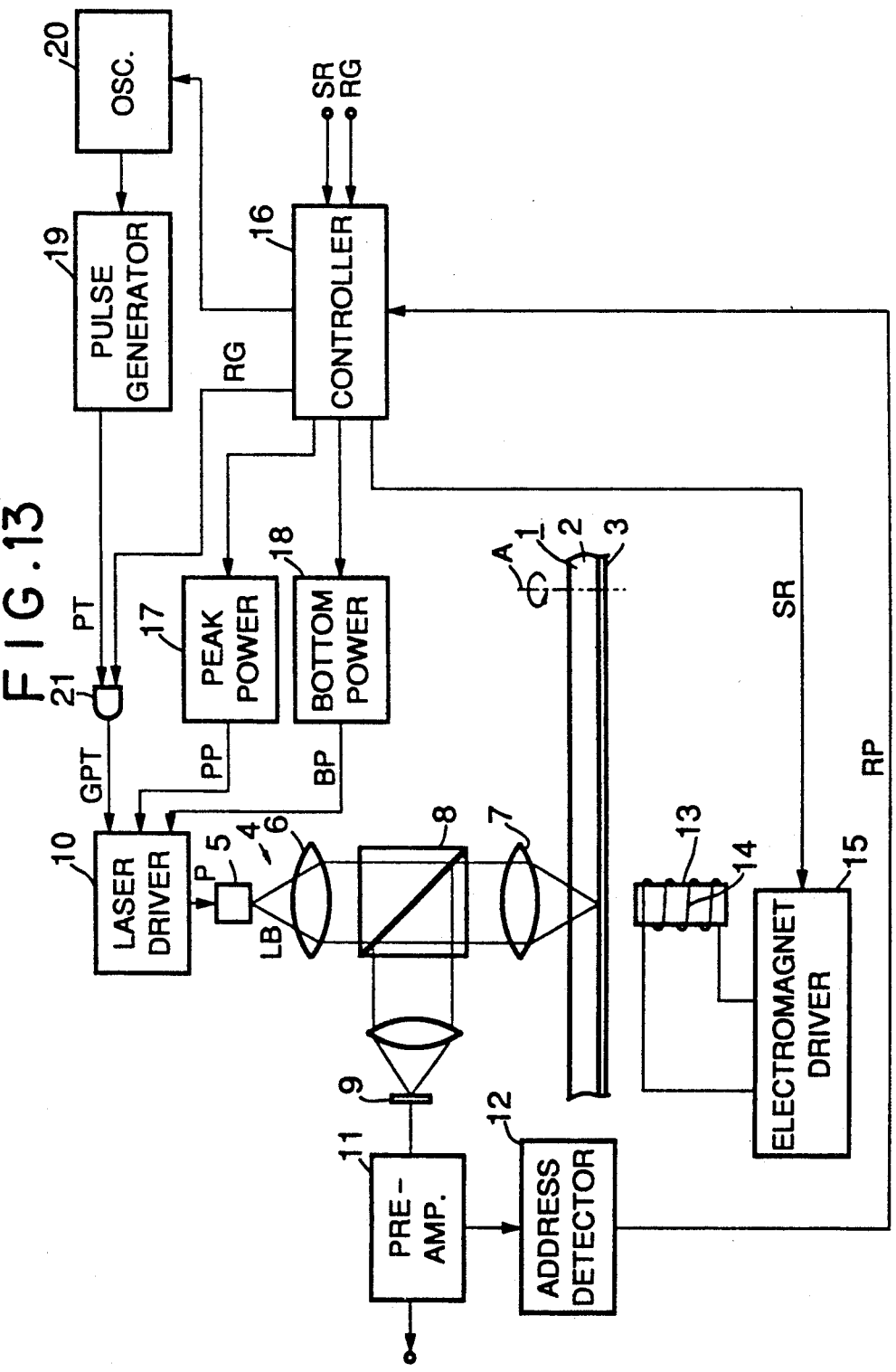

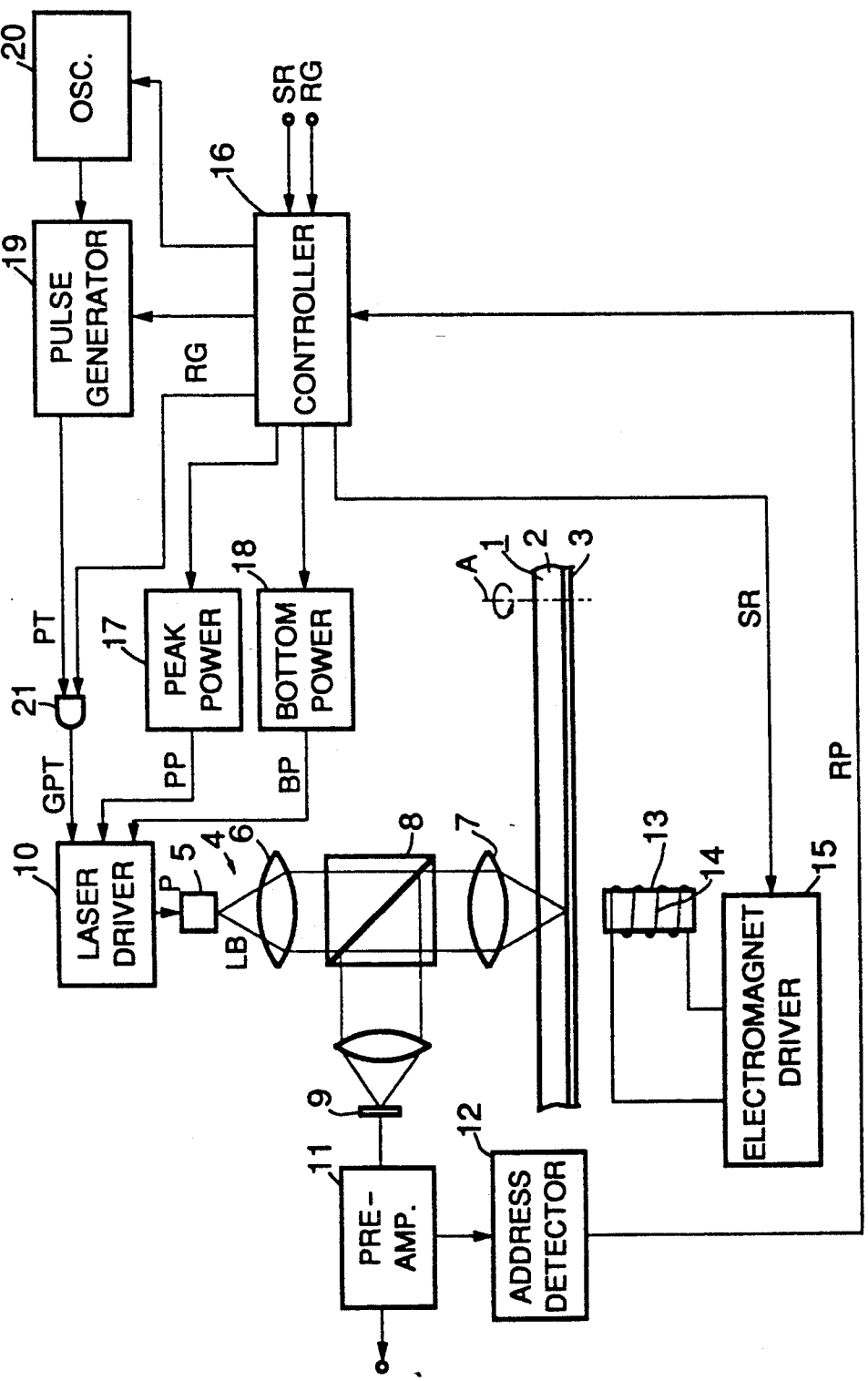

MAGNETO-OPTICAL RECORDING APPARATUS FOR CREATING MAGNETIC DOMAINS WITH REDUCED TAILS

BACKGROUND OF THE INVENTION

This invention relates to magneto-optical recording apparatus, more particularly to apparatus employing magnetic field modulation and a pulsed laser beam, capable of writing new information directly over old information.

Magneto-optical recording is a type of perpendicular magnetic recording in which a laser beam is focused onto a rotating disk in the presence of a magnetic field. Laser illumination raises a magnetic layer in the disk above its Curie temperature, thus demagnetizing it. When the magnetic layer leaves the beam spot and cools, it acquires the magnetic orientation of the magnetic field. Binary data 1 and 0 can be written by creating up- and down-oriented magnetic domains in circular or spiral tracks on the disk.

The extensive prior art in this field falls into two general categories: optical modulation and magnetic field modulation. In an optical modulation system, the laser beam is switched between high and low power levels according to the information to be recorded. To write new information over old, such a system either requires a disk with a complex multiple magnetic layer structure, or requires the disk to make two turns per track, the polarity of the magnetic field being switched between the two turns.

Magnetic field modulation is simpler: a single magnetic layer suffices and the disk need make only one turn per track. The laser beam can be held at a constant level while the polarity of the magnetic field is switched according to the information to be recorded.

A problem with magnetic field modulation is that the magnetic domains created on the disk have tails that degrade signal-to-noise performance. Use of a pulsed laser beam delivering one pulse per recorded bit has been proposed, but this scheme tends to leave gaps between recorded bits, especially near the perimeter of the disk, so that old information is incompletely erased, which again degrades signal-to-noise performance.

SUMMARY OF THE INVENTION

It is accordingly an object of the present invention to improve the signal-to-noise performance of magneto-optical recording by magnetic field modulation.

Another object of the invention is to create magnetic domains with reduced tails.

Yet another object of the invention is to ensure complete overwriting of old data at all radial positions on the disk.

A magneto-optical recording apparatus for recording an information signal on a disk comprises pulsed laser means for directing a pulsed laser beam having a frequency at least twice as high as the maximum frequency of the information signal onto a magnetic layer in the disk, and magnetic modulation means for applying to the magnetic layer a magnetic field having a polarity switched according to the information signal.

The magneto-optical recording apparatus preferably also comprises detector means for detecting the radial position of the pulsed laser beam on the disk, and controller means for modifying the peak power level, bottom power level, duty cycle, or frequency of the pulsed laser beam according to the detected radial position.

BRIEF DESCRIPTION OF THE DRAWINGS

FIG. 13 is a block diagram of a fifth embodiment of the magneto-optical recording apparatus of the present invention.

FIG. 14 is a block diagram of a sixth embodiment of the magneto-optical recording apparatus of the present invention.

DETAILED DESCRIPTION OF THE INVENTION

Novel magneto-optical recording apparatus embodying the present invention will be described below with reference to the drawings. Although only recording apparatus will be described, it will be apparent that the invention is applicable to apparatus having both recording and reproducing functions.

Figure 1:
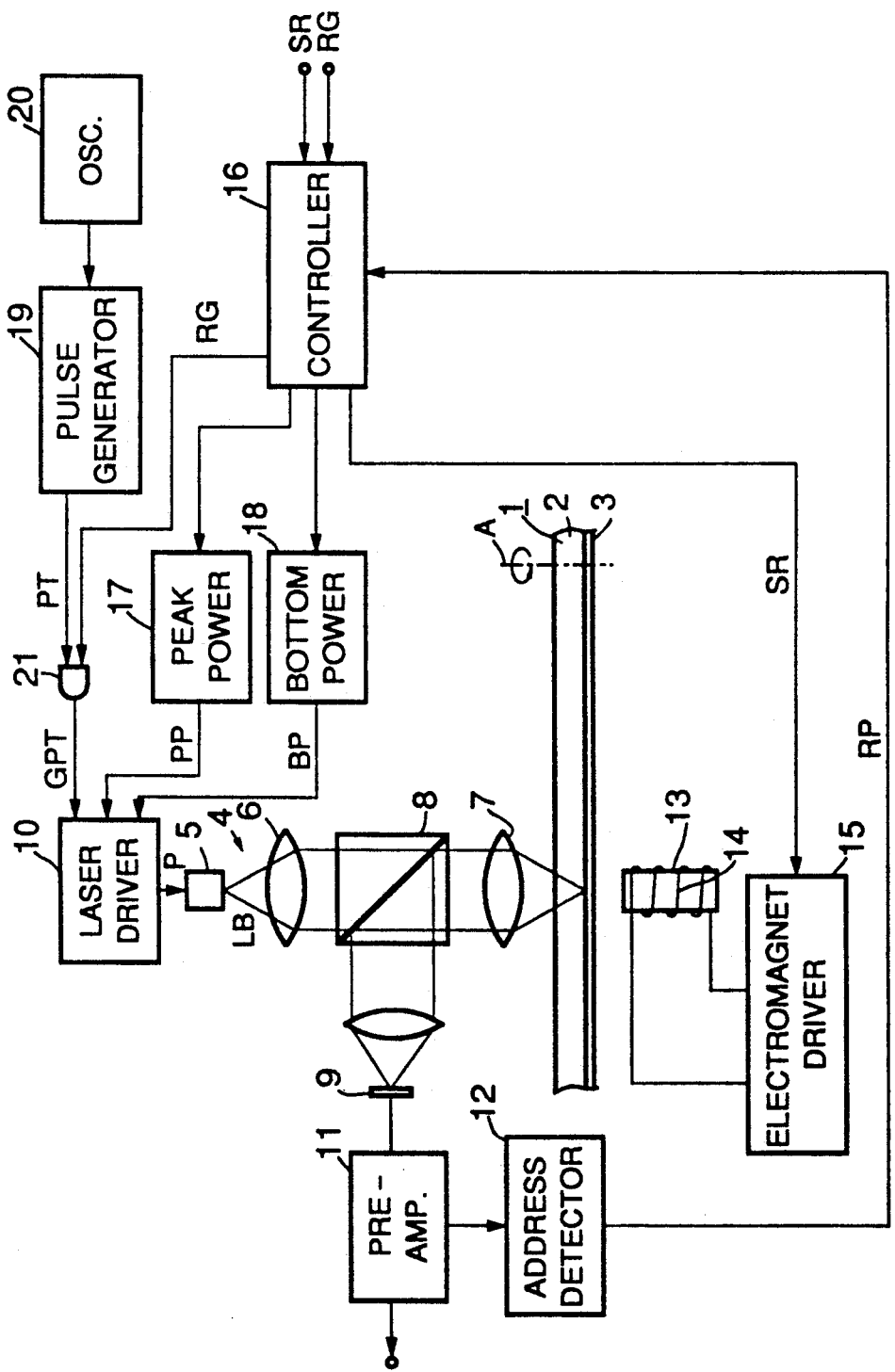
FIG. 1 is a block diagram of a first embodiment of the magneto-optical recording apparatus of the present invention.

With reference to FIG. 1, information is recorded on a disk 1 while the disk rotates about its central axis A. The disk 1 comprises a transparent substrate 2 to which a magnetic layer 3 is attached, and may also have a protective coating not shown in the drawing. An optical head 4 comprising a semiconductor laser diode 5, a collimator lens 6, a focusing lens 7, a beam splitter 8, and a photodetector 9 is disposed on one side of the disk 1. The optical head 4 is mounted so that it can move in the radial direction of the disk 1, maintaining a constant distance from the disk surface. A pulsed laser beam LB emitted by the laser diode 5 is collimated by the collimator lens 6, then focused by the focusing lens 7 onto a spot on the magnetic layer 3. The beam splitter 8, which is disposed between the collimator lens 6 and the focusing lens 7, serves to divert part of the light reflected back from the disk 1 to the photodetector 9. The laser diode 5 is driven by a pulsed current P received from a laser driver 10, as will be described later.

The photodetector 9 converts light reflected from the disk 1 to an electrical signal which is amplified by a preamplifier 11. The amplified electrical signal comprises a reproduced signal representing information recorded on the disk 1, and an address signal. An address detector 12 receives the amplified electrical signal from the preamplifier 11, detects the address signal, thereby recognizes the radial position of the laser beam on the disk 1, and generates a radial position signal RP.

An electromagnet 13 comprising a coil 14 is disposed on the opposite side of the disk 1 from the optical head 4, facing the spot to which the laser beam is focused by the focusing lens 7. The coil 14 is connected to the output terminals of an electromagnet driver 15, from which it receives exciting current, causing it to apply a magnetic field to the magnetic layer 3 at the location of the laser beam spot and in its surrounding vicinity.

The electromagnet driver 15 and the address detector 12 are connected to a controller 16, which receives the radial position signal RP from the address detector 12. The controller 16 also receives an information signal to be recorded (SR) and a record gate signal (RG). The controller 16 passes the information signal SR to the electromagnet driver 15, and passes the record gate signal RG to an AND gate 21 which will be described later. The electromagnet driver 15 switches the polarity of the exciting current fed to the coil 14 according to data in the information signal SR.

The controller 16 is also connected to a peak-power reference circuit 17 and a bottom-power reference circuit 18, which are in turn connected to the laser driver 10. The peak-power reference circuit 17 and the bottom-power reference circuit 18 generate, respectively, a peak-power signal PP and bottom-power signal BP. The peak- and bottom-power signals PP and BP are analog signals that are furnished to the laser driver 10 and regulate the peak and bottom power levels, respectively, of the pulsed current P.

The pulse width and frequency of the pulsed laser beam LB are controlled by a pulse generator 19 and oscillator 20. The oscillator 20 generates an oscillating signal with a frequency F at least twice the maximum frequency of the information signal SR. The pulse generator 19 receives this oscillating signal from the oscillator 20 and generates from it a pulse train PT having the same frequency F and a duty cycle of 50%. The term "duty cycle" refers herein to the ratio of the high or peak-power pulse width in the pulse train to the pulse period.

The pulse train from the pulse generator 19 is fed to one input of a two-input AND gate 21. The other input of the AND gate 21 receives the record gate signal RG from the controller 16. The AND gate 21 performs a logical AND operation on these two inputs to produce a gated pulse train GPT, which it sends to the laser driver 10. The gated pulse train GPT controls the frequency and duty cycle of the pulsed current P generated by the laser driver 10. Thus the pulsed current P alternates between a peak current level determined by the peak-power signal PP and a bottom current level determined by the bottom-power BP signal at a frequency F with 50% duty cycle.

The controller 16 is a computing device such as a single-chip microcomputer with a central processing unit (CPU), read-only memory (ROM), random access memory (RAM), input/output ports, and other well-known circuits. The peak-power reference circuit 17 and the bottom-power reference circuit 18 comprise digital-to-analog converters for converting digital outputs from the controller 16 to analog signal levels. Other structural details of the elements in FIG. 1 will be obvious to one skilled in the art and will not be recited here.

The term "pulsed laser means" refers to the optical head 4, the laser driver 10, the pulse generator 19, and the oscillator 20. The term "detector means" refers to the preamplifier 11 and the address detector 12. The term "magnetic modulation means" refers to the electromagnet 13, the coil 14, and the electromagnet driver 15. The term "controller means" refers to the controller 16, the peak-power reference circuit 17, and the bottom-power reference circuit 18.

Next the operation of this magneto-optical recording apparatus will be explained with reference to FIGS. 2 to 7.

Figure 2:
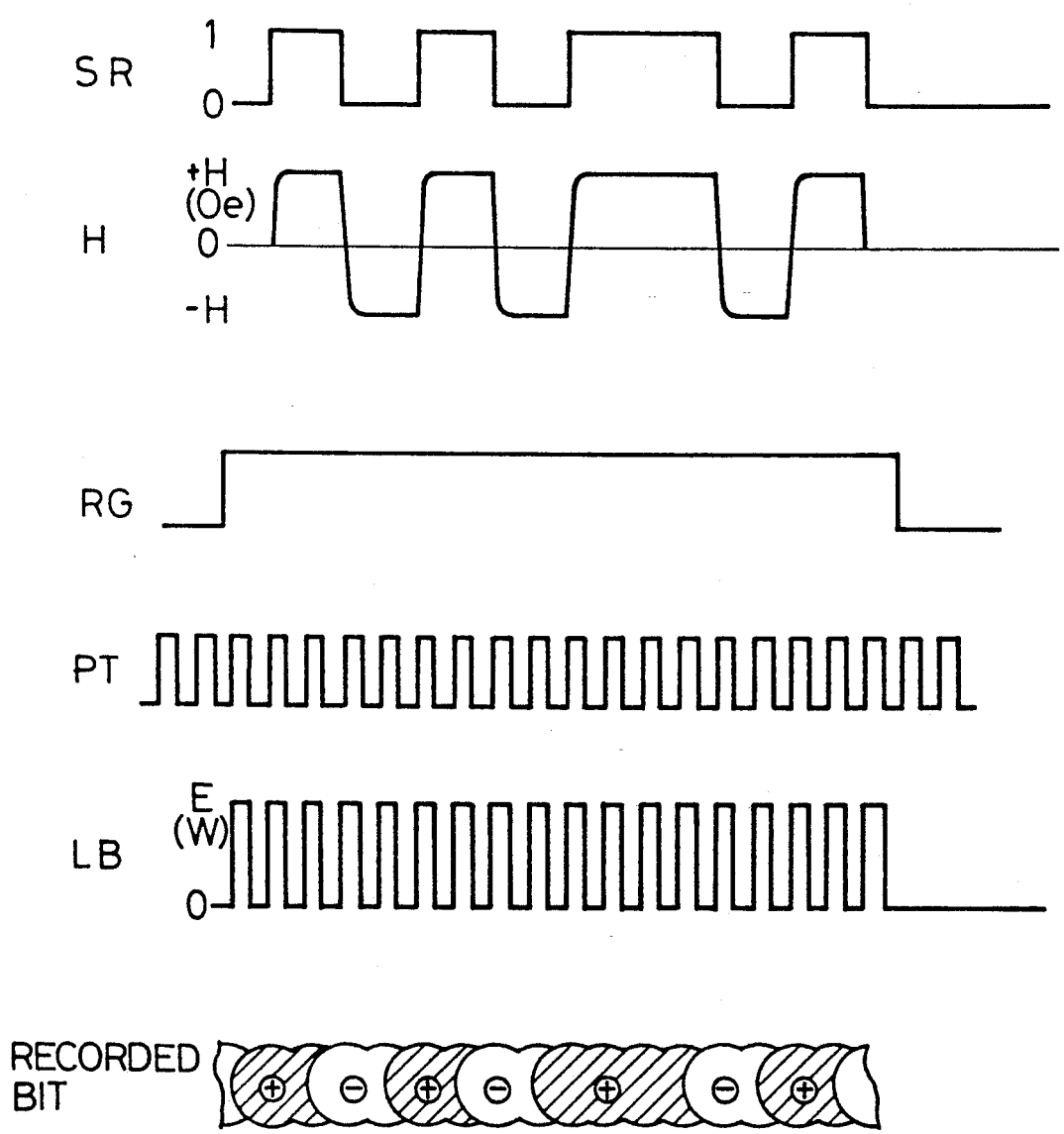
FIG. 2 illustrates signal waveforms at various points in FIG. 1 and shows the pattern of recorded bits on the disk.

The signal to be recorded is shown by the SR waveform in FIG. 2, representing for illustrative purposes the binary data 10101101. Actual recorded data would of course be much longer. The record gate signal RG is applied shortly before the beginning of the data, and terminated shortly after the end of the data.

During the interval while the RG signal is applied, the pulse train PT from the pulse generator 19 passes through the AND gate 21 to the laser driver 10, causing output of a pulsed current P from the laser driver 10 to the laser diode 5. The laser diode 5 thus generates the pulsed laser beam LB shown in FIG. 2. When the RG signal is not applied, the pulse train PT is stopped at the AND gate 21 and the pulsed laser beam LB is not output. (More precisely, the beam is maintained at its low power level.)

The peak and bottom levels of the LB pulses are controlled as follows. Address information prerecorded on the disk 1 is reproduced by the photodetector 9 and the preamplifier 11 and converted by the address detector 12 to the radial position signal RP sent to the controller 16, which thus learns the radial position of the optical head 4.

The controller 16 has a look-up table in its read-only memory indicating the appropriate peak and bottom power levels for each radial position. The controller 16 references this table according to the radial position signal RP, reads the corresponding peak and bottom power levels, and sends signals representing these levels to the peak-power reference circuit 17 and bottom-power reference circuit 18. The peak- and bottom-power reference circuits 17 and 18 convert these signals to the peak-power (PP) and bottom-power (BP) signals that control the peak and bottom levels of the pulsed current P output by the laser driver 10 to the laser diode 5. PP and BP thus control the peak and bottom power levels of the pulsed laser beam LB. In FIG. 2 the peak level is labeled E(W) and the bottom level is labeled 0 (zero).

The electromagnet driver 15 switches the polarity of the current fed to the coil 14 according to the information signal SR. The electromagnet 13 generates a magnetic field H the field vector of which is directed upward (having a value of +H oersteds) when the SR data is 1, and downward (having a value of −H oersteds) when the SR data is 0, as illustrated in FIG. 2.

As the disk 1 turns, areas of the magnetic layer 3 that are illuminated by the pulsed laser beam are heated beyond their Curie temperature and demagnetized. Upon leaving the beam spot they quickly cool below their Curie temperature, in the process acquiring the magnetization of the magnetic field H applied by the electromagnet 13. The result is a series of domains magnetized in the up direction (indicated by a circled plus sign in FIG. 2) or the down direction (indicated by a circled minus sign). These domains form recorded bits representing the values of the SR data, as shown at the bottom of FIG. 2.

Due to the high pulse frequency of the laser beam (at least two pulses per recorded bit), the areas illuminated by the laser beam and heated above their Curie temperature overlap one another to a considerable extent, so there are no gaps between recorded bits. New data can therefore be recorded directly over old data, completely erasing the old data.

Figure 3A:
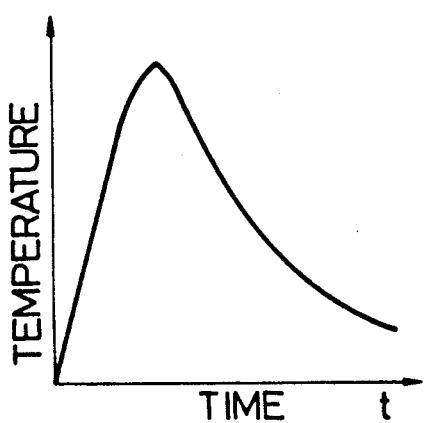
FIGS. 3A and 3B illustrate temperature changes produced by continuous and pulsed laser illumination.
Figure 3B:
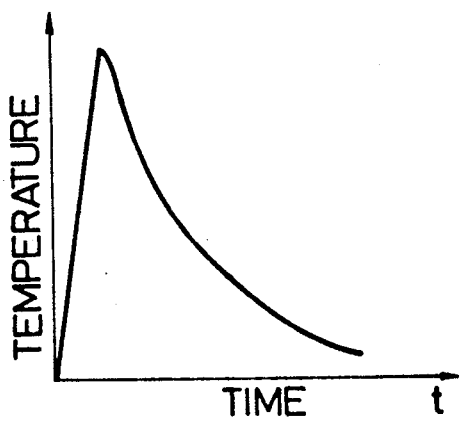

The recorded bits have a characteristic shape, resembling the tail of an arrow, that is determined by the temperature distribution in the magnetic layer 3. The temperature changes undergone by a point on the magnetic layer 3 are illustrated in FIGS. 3A and 3B for continuous and pulsed laser illumination. Under continuous illumination, the temperature rises gradually to a peak value, then gradually declines as shown in FIG. 3A. Under pulsed illumination the temperature rise and decline are more abrupt, as shown in FIG. 3B. The reason for the more abrupt rise in FIG. 3A is that since energy is delivered only during the limited duration of the pulse, energy is delivered with greater intensity per unit area. The reason for the more abrupt decline in FIG. 3B is that the pulse is switched off about the time the maximum temperature is reached.

Figure 4A:
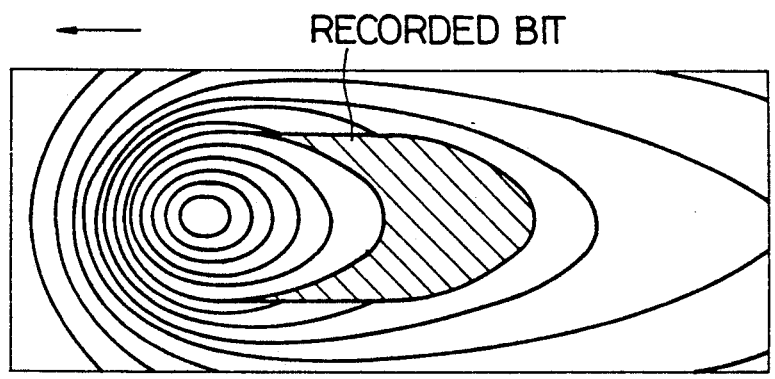
FIGS. 4A and 4B illustrate temperature distributions produced by continuous and pulsed laser illumination.
Figure 4B:
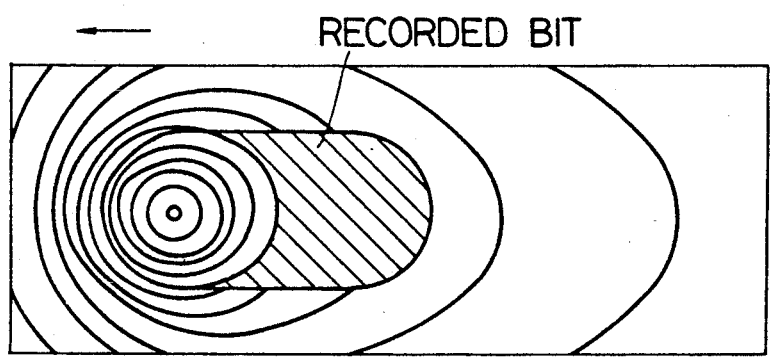

The temperature distributions in the magnetic layer 3 resulting from these temperature changes are illustrated in FIG. 4A for continuous laser illumination and FIG. 4B for pulsed laser illumination. The lines in FIGS. 4A and 4B are isolines representing equal-temperature contours. The arrow indicates the direction of apparent motion of the laser beam spot. Under continuous illumination, the isolines trail back in the direction opposite to the arrow for a considerable distance, due to the slow cooling curve in FIG. 3A. In FIG. 4B the isolines are more nearly circular.

It is these isolines that determine the shape of the recorded bits, as indicated by shading in FIGS. 4A and 4B. Thus the tails of bits recorded by pulsed laser illumination are less pronounced than the tails of bits recorded by continuous laser illumination, as can be seen by comparing the shaded areas in FIGS. 4A and 4B. As a result, when the disk 1 is read, the amplitude of the reproduced signal is higher for bits recorded using a pulsed laser beam than for bits recorded using a continuous laser beam. This will be explained next.

Figure 5:
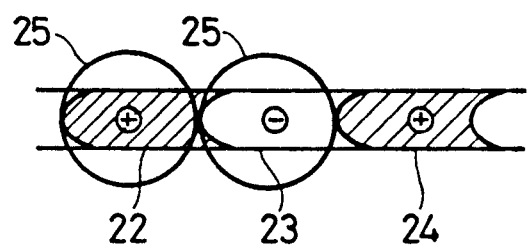
FIG. 5 illustrates the reading of information recorded by magnetic field modulation on a magneto-optic disk.

FIG. 5 schematically illustrates the reading of information recorded by magnetic modulation, showing three recorded bits 22, 23, and 24 representing the binary data 101. The information is read by illuminating the recorded bits with a weak laser beam spot 25 and detecting the reflected light. Due to the shape of the recorded bits, when the beam spot 25 is positioned on the second recorded bit 23 it also picks up the tails of the first recorded bit 22 (and when positioned on the first recorded bit 22 it also picks up the tails of the preceding recorded bit). That is, there is a certian amount of bit-to-bit contamination which reduces the amplitude of the reproduced signal.

Figure 6:
FIG. 6 illustrates signal waveforms and a pattern of recorded bits recorded by magnetic field modulation using continuous laser illumination.
Figure 6:
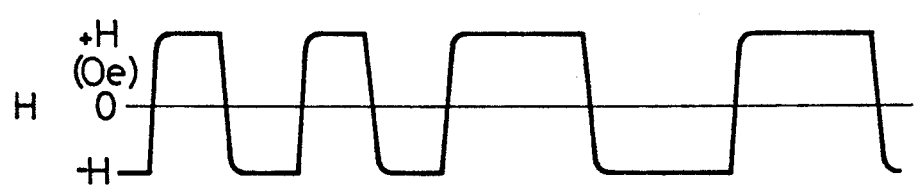
Figure 6:
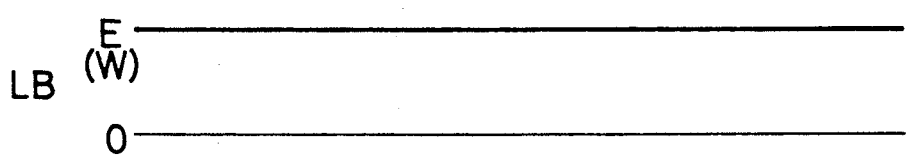
Figure 6:

FIG. 6 shows data recorded using a continuous laser beam. The symbols SR, H, and LB and the circled plus and minus signs have the same meaning as in FIG. 2. A comparison of FIGS. 6 and 2, with reference to FIG. 5, shows that a pulsed laser beam produces mush less bit-to-bit contamination than a continuous laser beam. As a result, information recorded using a pulsed laser beam can be reproduced with a better signal-to-noise ratio (or carrier-to-noise ratio).

Next the reason for varying the peak and bottom levels of the laser beam pulses will be explained.

The apparent velocity of the beam spot increases as the beam moves outward on the disk 1, which rotates with constant angular velocity, so toward the perimeter the recorded bits are elongated. If pulses with constant peak and bottom power levels were used, then near the perimeter of the disk 1 there would be less overlap between regions heated above their Curie temperature; hence when new information was written over old, the old information would not be completely erased.

Figure 7:
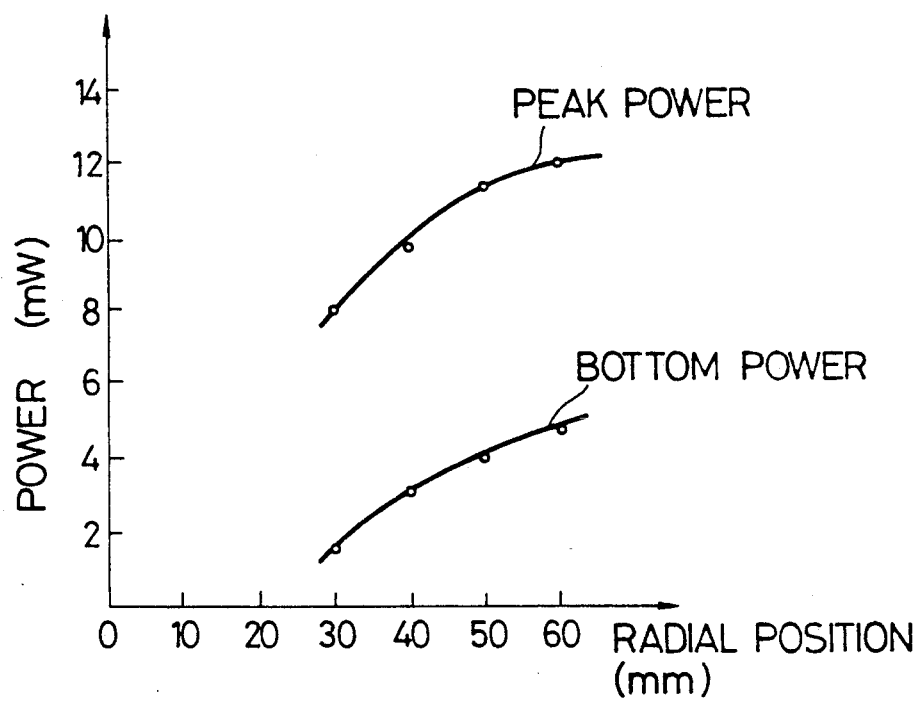
FIG. 7 is a graph illustrating the control of peak and bottom laser power in relation to radial position in the first novel magneto-optical recording apparatus.

To prevent this, the peak power level and bottom power level of the laser are both increased, as shown in FIG. 7, as the pulsed laser beam moves outward in the radial direction on the disk. The curves in FIG. 7 are appropriate for a disk 130 mm in diameter turning at a speed of 2400 rpm. Due to the increased bottom power level near the perimeter, enough energy is delivered to the magnetic layer 3 to erase old information even when the pulse is at its bottom level, ensuring that newly recorded information can be reproduced with a satisfactory signal-to-noise ratio.

Values corresponding to the curves in FIG. 7 are stored in the look-up table in the read-only memory of the controller 16. Alternatively, the controller 16 can be programmed to calculate the peak and bottom power levels from mathematical formulas. Quadratic formulas of the form shown below can be used, where R represents radial position and A, B, and C are constants.

$$\text{Laser power} = AR^2 + BR + C$$

Instead of varying both the peak and bottom power levels as shown in FIG. 7, it is possible to obtain substantailly the same effect by varying only the bottom power level. An advantage of this scheme is that the bottom power level is easier to control, the peak power level being limited by the absolute maximum current of the laser diode 5. If this scheme is adopted the peak and bottom power levels can be made equal at the perimeter of the disk, resulting in continuous laser illumination at the perimeter.

A similar effect can also be obtained by holding the bottom power level constant and increasing only the peak power level as the beam moves outward on the disk 1, if this is within the capabilities of the apparatus.

Figure 8:
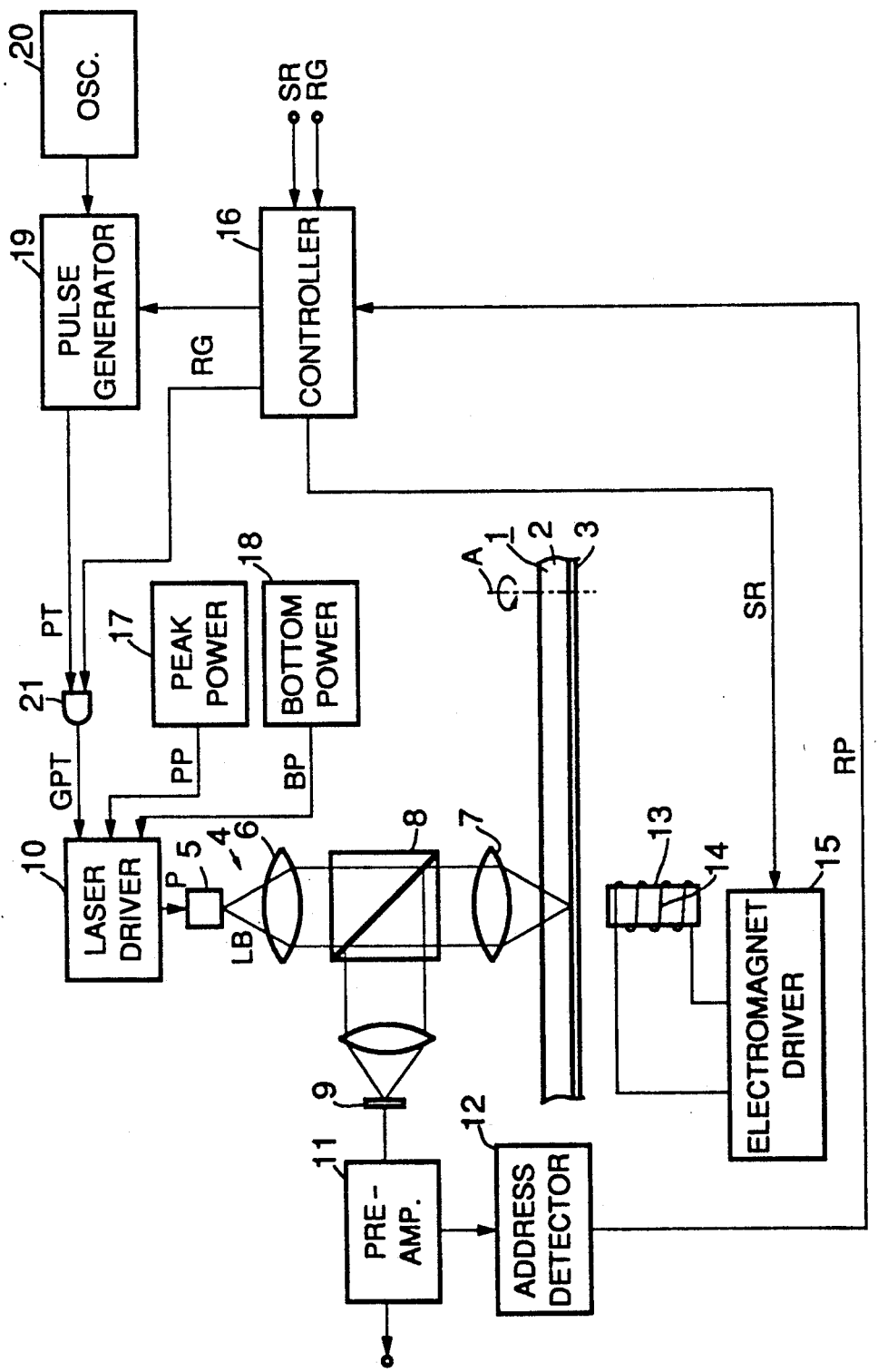
FIG. 8 is a block diagram of a second embodiment of the magneto-optical recording apparatus of the present invention.

FIG. 8 is a block diagram of a second embodiment of the magneto-optical recording apparatus of the present invention. In this magneto-optical recording apparatus the peak and bottom power levels of the laser beam pulses are fixed, but the controller 16 varies the duty cycle of the pulse train PT generated by the pulse generator 19. Accordingly, the controller 16 is connected to the pulse generator 19 instead of to the peak-power reference circuit 17 and the bottom-power reference circuit 18. By modifying the duty cycle of the PT pulses, the controller 16 controls the duty cycle of the pulsed laser beam LB.

Figure 9:
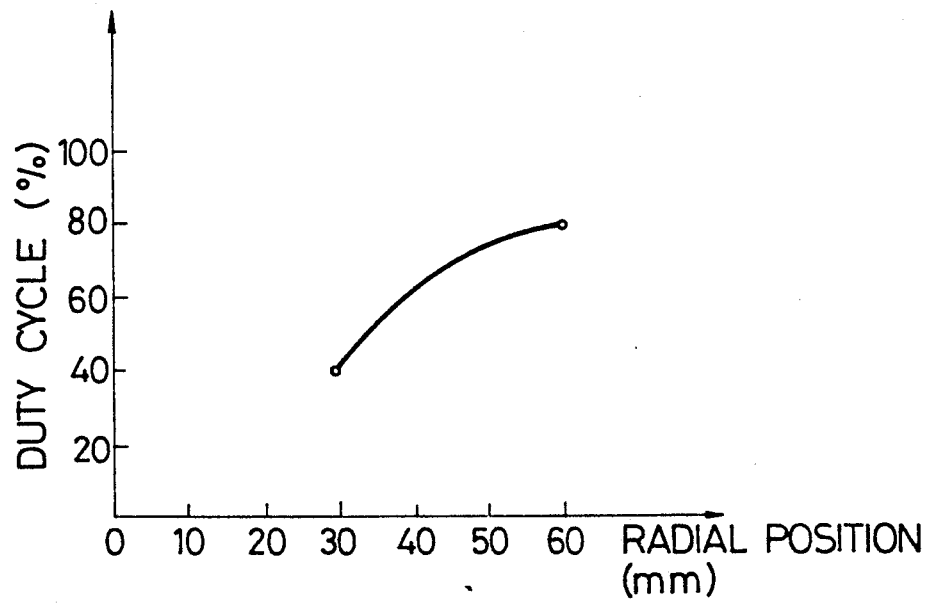
FIG. 9 is a graph illustrating the control of laser pulse duty cycle in relation to radial position in the second embodiment of the magneto-optical recording apparatus.

FIG. 9 shows an example of the duty cycle control curve, radial position being indicated on the horizontal axis and duty cycle on the vertical axis. When the optical head 4 is positioned near the center of the disk 1, on the innermost track, the duty cycle is 40%. As the optical head 4 moves outward the duty cycle gradually rises, reaching 80% at the perimeter. The increased duty cycle compensates for the increased spacing of the recorded bits, assuring sufficient overlap of the areas in which the Curie temperature is exceeded.

Data representing the curve in FIG. 9 can be stored in the read-only memory of the controller 16. Alternatively, the controller 16 can calculate the appropriate duty cycle from a mathematical formula. The duty cycle at the perimeter of the disk 1 can be as high as 100%, producing continuous laser illumination.

Figure 10:
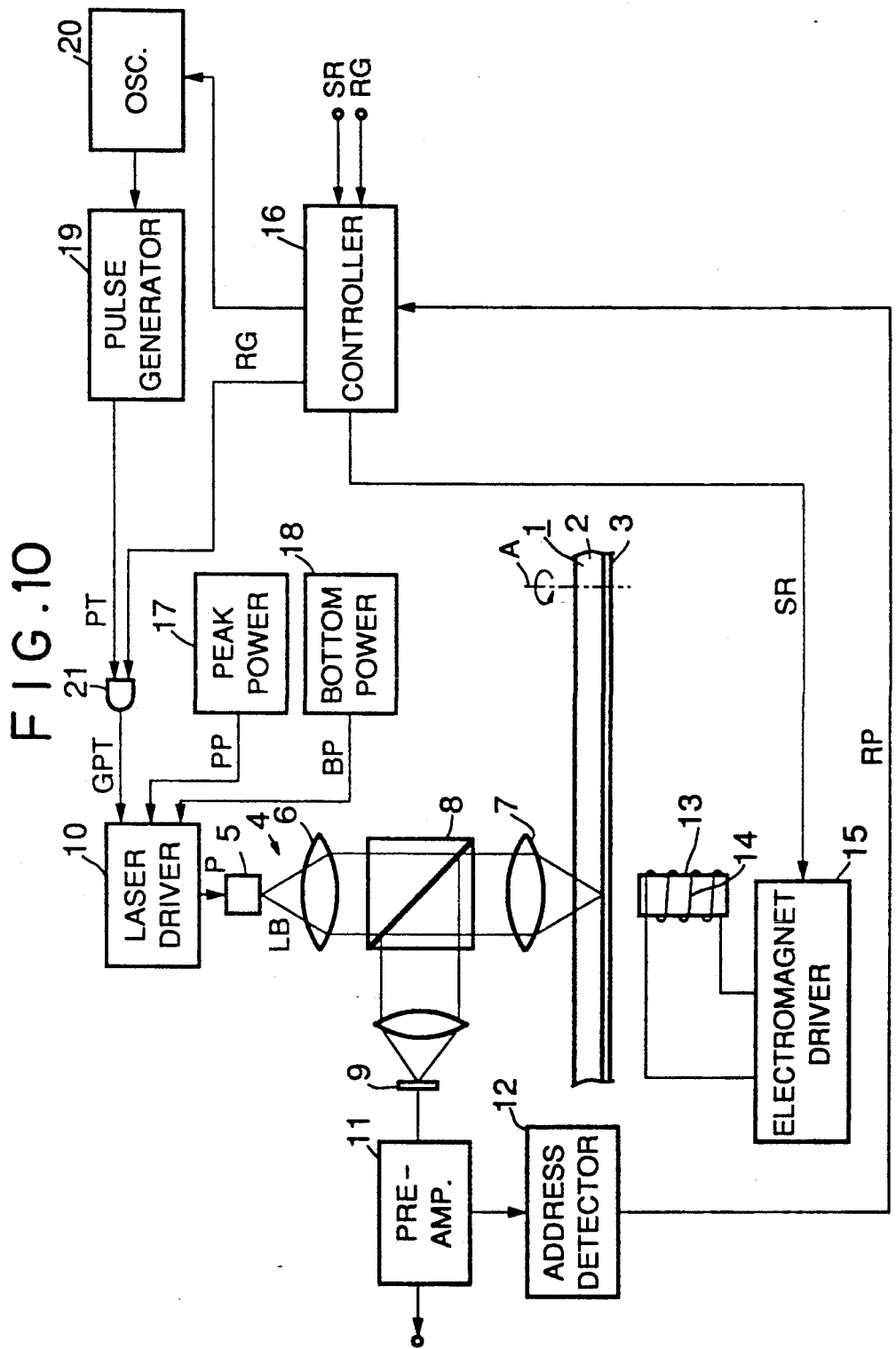
FIG. 10 is a block diagram of a third embodiment of the magneto-optical recording apparatus of the present invention.

FIG. 10 is a block diagram of a third embodiment of the magneto-optical recording apparatus of the present invention in which the peak and bottom power levels and duty cycle of the pulsed laser beam are held constant, but the controller 16 varies the frequency F. The controller 16 is accordingly connected to the oscillator 20 and not to the peak-power reference circuit 17, the bottom-power reference circuit 18, or the pulse generator 19. The controller 16 increases the frequency F of the oscillator 20 as the optical head 4 moves from the inner part of the disk 1 toward the edge, the frequency F always being at least twice the maximum frequency of SR.

Figure 11:
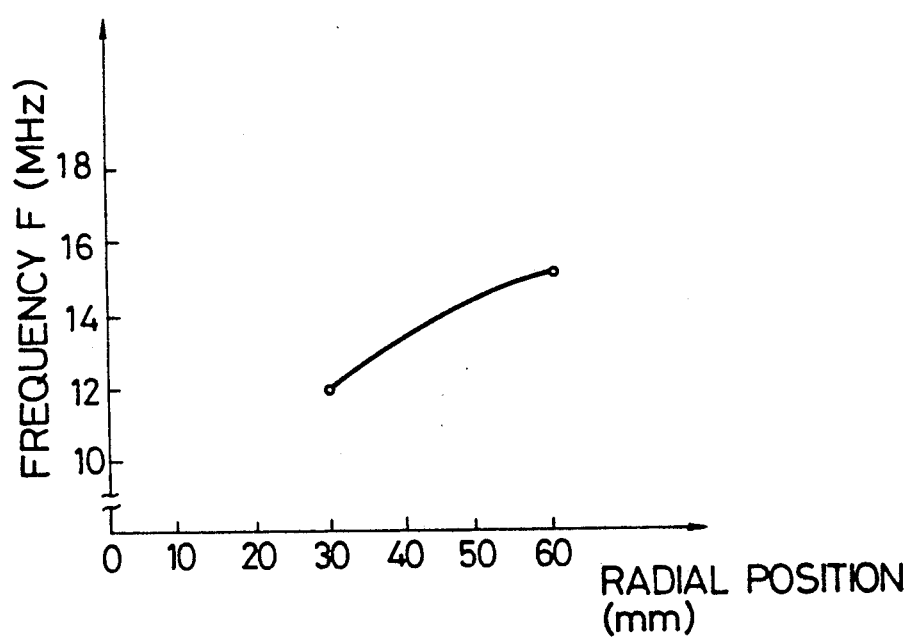
FIG. 11 is a graph illustrating the control of pulse frequency in relation to radial position in the third embodiment of the magneto-optical recording apparatus.

FIG. 11 shows an example of the frequency control curve, radial position being indicated on the horizontal axis and frequency on the vertical axis. The linear speed of the disk 1 increases from the innermost track toward the perimeter, but the frequency of the laser beam pulses increases in compensating fashion, thus maintaining the same spatial density of the pulses. The amount of overlap between spots heated above their Curie temperatures by successive pulses of the laser beam is accordingly the same at the perimeter of the disk as nearer the center. (It suffices for the spacing between pulses to be substantially equal to half the radius of the beam spot: 0.6 micrometers or less, for example.) Energy is thus deposited in a continuous pattern on the magnetic layer 3 without gaps between recorded bits.

The curve in FIG. 11 can be stored in the form of a look-table in the read-only memory of the controller 16, or the controller 16 can be programmed to calculate the frequency values from a mathematical formula.

The power level, duty cycle, and frequency control schemes described above can be combined as shown below.

Figure 12:
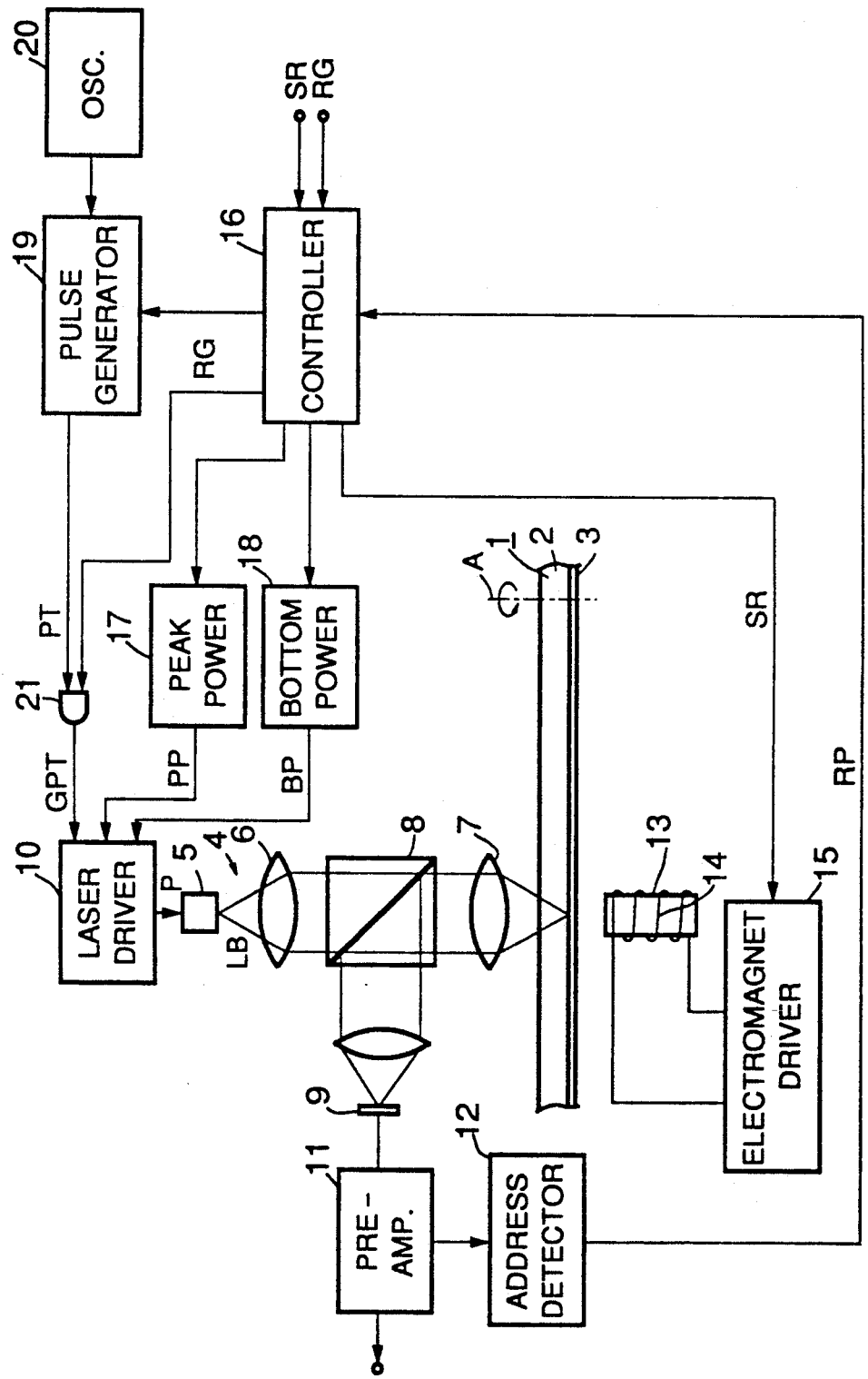
FIG. 12 is a block diagram of a fourth embodiment of the magneto-optical recording apparatus of the present invention.

FIG. 12 is a block diagram of a fourth embodiment of the magneto-optical recording apparatus of the present invention in which the controller 16 controls the peak and bottom power levels and the duty cycle of the pulsed laser beam. The controller 16 is accordingly connected to the peak-power reference circuit 17, the bottom-power reference circuit 18, and the pulse generator 19. The peak and bottom power levels can be controlled as shown in FIG. 7, for example, and the duty cycle as shown in FIG. 9. In this way the amount of overlap between spots heated above their Curie temperatures by successive pulses of the laser beam can be equalized in all tracks on the disk 1, so that energy is deposited in a continuous pattern.

FIG. 13 is a block diagram of a fifth embodiment of the magneto-optical recording apparatus of the present invention in which the controller 16 controls the peak and bottom power levels of the pulsed laser beam and the frequency of the pulses. The controller 16 is accordingly connected to the peak-power reference circuit 17, the bottom-power reference circuit 18, and the oscillator 20. The peak and bottom power levels can be controlled as shown in FIG. 7, for example, and the duty cycle as shown in FIG. 11. By appropriate control of these three parameters it is possible to ensure adequate erasure of previously recorded information and a good signal-to-noise ratio.

FIG. 14 is a block diagram of a sixth embodiment of the magneto-optical recording apparatus of the present invention in which the controller 16 controls the peak and bottom power levels, the duty cycle of the pulsed laser beam and the frequency of the pulses. The controller 16 is accordingly connected to the peak-power reference circuit 17, the bottom-power reference circuit 18, the pulse generator 19, and the oscillator 20. The peak and bottom power levels can be controlled as shown in FIG. 7, the duty cycle as in FIG. 9, and the frequency as in FIG. 11. By controlling all four parameters it is possible to obtain excellent reproduced signal quality over the entire area of the disk 1.

In the preceding embodiments of the magneto-optical recording apparatus of the present invention, the radial position of the laser beam was determined by detecting address signals pre-recorded on the disk 1, but radial position can also be determined by detecting the absolute position of the optical head 4, by means of a linear position detector, for example. Those skilled in the art will readily notice other modifications that can be made without departing from the spirit and scope of this invention, which should be determined solely from the appended claims.

What is claimed is:

1. A magneto-optical recording apparatus for recording an information signal having a certain maximum frequency on a disk having a magnetic layer, comprising:

pulsed laser means for directing onto said magnetic layer a pulsed laser beam with a waveform having a certain peak power level, bottom power level, and duty cycle and having a frequency at least twice as high as said maximum frequency of said information signal;

magnetic modulation means for applying to said magnetic layer a magnetic field having a polarity switched according to said information signal;

detector means for detecting a radial position of said pulsed laser beam on said disk; and controller means, connected to said pulsed laser means and said detector means, for increasing said peak power level, bottom power level, duty cycle, and frequency of said waveform as said radial position of said pulsed laser beam increases wherein said controller means modifies said duty cycle according to said radial position.

2. The apparatus of claim 1, wherein said controller means increases said duty cycle as said pulsed laser beam moves radially outward on said disk.

3. The apparatus of claim 1, wherein said controller means modifies said bottom power level, said peak power level, and said frequency F according to said radial position.

4. The apparatus of claim 3, wherein said controller means increases said bottom power level, said peak power level, and said frequency F as said pulsed laser beam moves radially outward on said disk.

5. A magneto-optical recording apparatus for recording an information signal having a certain maximum frequency on a disk having a magnetic layer, comprising:
pulsed laser means for directing onto said magnetic layer a pulsed laser beam with a waveform having a certain peak power level, bottom power level, and duty cycle and having a frequency at least twice as high as said maximum frequency of said information signal;
magnetic modulation means for applying to said magnetic layer a magnetic field having a polarity switched according to said information signal;
detector means for detecting a radial position of said pulsed laser beam on said disk; and
controller means, connected to said pulsed laser means and said detector means, for increasing said peak power level, bottom power level, duty cycle, and frequency of said waveform as said radial position of said pulsed laser beam increases wherein said controller means modifies said frequency according to said radial position.

6. The apparatus of claim 5, wherein said controller means increases said frequency F as said pulsed laser beam moves radially outward on said disk.

7. The apparatus of claim 5, wherein said controller means modifies said bottom power level, said peak power level, and said duty cycle according to said radial position.

8. The apparatus of claim 7, wherein said controller means increases said bottom power level, said peak power level, and said duty cycle as said pulsed laser beam moves radially outward on said disk.

9. A magneto-optical recording apparatus for recording an information signal having a maximum frequency on a disk having a magnetic layer, comprising:
a controller for receiving said information signal and a recording gate signal;
an oscillator for generating an oscillating signal having a frequency at least twice as high as said maximum frequency of said information signal;
a pulse generator, connected to said oscillator, for receiving said oscillating signal and generating therefrom a pulse train having said frequency and a certain duty cycle;
an AND gate connected to said controller and said pulse generator, for ANDing said pulse train with said recording gate signal, thus generating a gated pulse train;
a peak-power reference circuit for generating a peak-power signal;
a bottom-power reference circuit for generating a bottom-power signal;
a laser driver connected to said AND gate, said peak-power reference circuit, and said bottom-power reference circuit, for receiving said gated pulse train said peak-power signal, and said bottom-power signal and generating therefrom a pulsed current alternating between a peak current level determined by said peak-power signal and a bottom current level determined by said bottom-power signal, with said frequency and said duty cycle;
an optical head for receiving said pulsed current, generating therefrom a pulsed laser beam having a peak power level determined by said peak current level and a bottom power level determined by said bottom current level, and focusing said pulsed laser beam onto a spot on said magnetic layer;
an electromagnet for applying a magnetic field to said magnetic laser at said spot; and
an electromagnet driver connected to said controller and said electromagnet for receiving said information signal from said controller, applying an exciting current to said electromagnetic, and switching a polarity of said exciting current responsive to said information signal.

10. The apparatus of claim 9, wherein said duty cycle is substantially 50 percent.

11. The apparatus of claim 9, wherein said optical head comprises:
a laser diode connected to said laser driver, for receiving said pulsed current and generating said pulsed laser beam;
a collimator lens disposed between said laser diode and said disk, for collimating said pulsed laser beam; and
a focusing lens disposed between said collimating lens and said disk, for focusing said pulsed laser beam onto said magnetic layer.

12. The apparatus of claim 11, wherein said optical head further comprises;
a beam splitter, disposed between said collimator lens and said focusing lens, for diverting light reflected from said disk; and
a photodector for receiving light diverted by said beam splitter and converting the received light to an electrical signal.

13. The apparatus of claim 12, wherein said optical head is movable with respect to said disk in a radial direction.

14. The apparatus of claim 13, further comprising:
a preamplifier for receiving and amplifying said electrical signal, thus generating an amplified electrical signal; and
an address detector connected to said preamplifier and said controller, for receiving said amplified electrical signal, detecting a radial position of said pulsed laser beam on said disk, and sending a radial position signal to said controller.

15. The apparatus of claim 14, wherein said controller is connected to said peak-power reference circuit and modifies said peak-power signal according to said radial position signal.

16. The apparatus of claim 15, wherein said peak-power signal is increased in power as said pulsed laser beam moves radially outward on said disk.

17. The apparatus of claim 14, wherein said controller is connected to said bottom-power reference circuit and modifies said bottom-power signal according to said radial position signal.

18. The apparatus of claim 17, wherein said bottom-power signal is increased in power as said pulsed laser beam moves radially outward on said disk.

19. The apparatus of claim 14, wherein said controller is connected to said pulse generator and modifies said duty cycle according to said radial position signal.

20. The apparatus of claim 19, wherein said duty cycle is increased as said pulsed laser beam moves radially outward on said disk.

21. The apparatus of claim 14, wherein said controller is connected to said oscillator and modifies said frequency according to said radial position signal.

22. The apparatus of claim 21, wherein said frequency is increased as said pulsed laser beam moves radially outward on said disk.

23. The apparatus of claim 14, wherein said controller is connected to said bottom-power reference circuit and said peak-power reference circuit and modifies both said bottom-power signal and said peak-power signal according to said radial position signal.

24. The apparatus of claim 23, wherein said peak-power signal and said bottom-power signal are both increased in power as said pulsed laser beam moves radially outward on said disk.

25. The apparatus of claim 14, wherein said controller is connected to said peak-power reference circuit, said bottom-power reference circuit, and said pulse generator, and modifies said peak-power signal, said bottom-power signal, and said duty cycle according to said radial position signal.

26. The apparatus of claim 25, wherein said peak-power signal, bottom-power signal, and said duty cycle are increased as said pulsed laser beam moves radially outward on said disk.

27. The apparatus of claim 14, wherein said controller is connected to said peak-power reference circuit, said bottom-power reference circuit, and said oscillator, and modifies said peak-power signal, said bottom-power signal, and said frequency according to said radial position signal.

28. The apparatus of claim 27, wherein said peak-power signal, bottom-power signal, and said frequency F are increased as said pulsed laser beam moves radially outward on said disk.

29. The apparatus of claim 14, wherein said controller is connected to said peak-power reference circuit, said bottom-power reference circuit, said pulse generator, and said oscillator, and modifies said peak-power signal, said bottom-power signal, said duty cycle, and said frequency according to said radial position signal.

30. The apparatus of claim 29, wherein said peak-power signal, bottom-power signal, said duty cycle, and said frequency are increased as said pulsed laser beam moves radially outward on said disk.

* * * * *